United States Patent [19]

Lägler

[11] Patent Number: 5,271,751
[45] Date of Patent: Dec. 21, 1993

[54] DEVICE FOR REMOVING DUST FROM A MACHINE

[75] Inventor: Eugen Lägler, Bundesrepublik, Fed. Rep. of Germany

[73] Assignee: Eugen Laegler GmbH, Gueglingen-Frauenzimmern, Fed. Rep. of Germany

[21] Appl. No.: 18,417

[22] Filed: Feb. 17, 1993

[30] Foreign Application Priority Data

Feb. 18, 1992 [DE] Fed. Rep. of Germany ....... 4204789

[51] Int. Cl.[5] ...................... B01D 46/04; B01D 45/12
[52] U.S. Cl. ...................... 55/293; 55/337; 55/429; 55/433; 55/498; 55/516
[58] Field of Search ................ 55/282, 293, 295, 337, 55/429, 433, 498, 516, 521

[56] References Cited

U.S. PATENT DOCUMENTS

| | | | |
|---|---|---|---|
| 3,113,923 | 10/1963 | Bingham | 55/295 X |
| 3,373,545 | 3/1968 | Christianson | 55/293 X |
| 3,895,929 | 7/1975 | Iysky et al. | 55/337 X |
| 3,920,426 | 11/1975 | Tu et al. | 55/337 |

FOREIGN PATENT DOCUMENTS

| | | |
|---|---|---|
| 8219939 | 7/1928 | Fed. Rep. of Germany . |
| 653165 | 11/1937 | Fed. Rep. of Germany . |
| 896285 | 11/1953 | Fed. Rep. of Germany . |
| 933921 | 10/1955 | Fed. Rep. of Germany . |
| 1165390 | 3/1964 | Fed. Rep. of Germany . |
| 2500875 | 7/1975 | Fed. Rep. of Germany . |
| 2277986 | 9/1982 | Fed. Rep. of Germany . |
| 3712279 | 10/1988 | Fed. Rep. of Germany . |

Primary Examiner—Charles Hart
Attorney, Agent, or Firm—Browdy and Neimark

[57] ABSTRACT

When work processing equipment and more particularly floor sanding machines have means for drawing off dust, they are also fitted with a device for aspiration of the dust laden air and the collection of the dust. The device in accordance with the invention comprises a filter device, arranged in the flow path of the air, manufactured of an air permeable material retaining the dust so that dust-free air is released into the surroundings.

In the flow path upstream from the filter device there is a dust separator, which at the lower side thereof has a dust outlet opening and above the dust outlet opening has an air outlet opening facing the filter device. Underneath the dust outlet opening it is possible for a dust collecting container to be connected with the result that the separated dust drops under the effect of gravity into the container. It is convenient if the filter device delimits a filter chamber with a dust outlet opening on the lower side. The dust collecting container is arranged underneath the dust outlet opening. The connecting passage from the dust outlet opening to the container is provided with a valve device which may be moved between a closed operational position and an open cleaning position.

13 Claims, 2 Drawing Sheets

DEVICE FOR REMOVING DUST FROM A MACHINE

BACKGROUND OF THE INVENTION

The present invention relates to a device for removing dust coming from air from a work processing machine and more particularly from a floor sanding machine, comprising a dust separator arranged in the flow path in the form of a centrifugal or cyclone separator, which has a lower dust outlet opening from which the separated dust drops along a descent path to a connection port for connection with a dust collecting container, and an upper air outlet opening for the outlet of the air freed of dust, and with a filter device arranged in the flow path downstream from the dust separator for filtering out the remaining dust, which has an annular configuration and surrounds the dust separator with the formation of filter chamber, which is connected with the air outlet opening of the dust separator.

It is more particularly in the case of wood working machines and specifically in the case of machines for sanding floors that it is conventional to draw off the dust produced by means of a blower from the respective point of work processing and to supply the air containing the dust to a dust filter bag, whose wall material retains the dust so that the dust will collect in the filter bag, whereas the cleaned air will flow off through the material of the wall. This method of dealing with dust has various disadvantages:

With an increase in the height of filling of the filter bag there is an decrease in the free surface area of its wall material and consequently of the area available for the escape of the air to the outside. This is responsible for a corresponding drop in the suction performance with the result that the filter bag has to be replaced by a fresh one after a comparatively short period of time when it is only partly full. Such filter bags are however comparatively expensive, and there is the further aspect labor being necessary for changing of the bag.

Furthermore the filter bag material, even above the level of filling, is heavily laden with dust, this meaning that on changing the filter bag a cloud of dust will emerge from it if it is held in the hand and thereby unavoidably bent.

Departing from this normally adopted practical method of operating it is more advantageous to utilize a device of the type initially mentioned as disclosed in the German patent publication 1,165,390 B or the German patent publication 896,285 C. In the case of such a device the dust separator arranged upstream from the filter device serves to remove the greater part of the dust from the air flow. This dust then directly goes into the sealed off dust collector container, which, because it does not have any filter function and exclusively functions to collect the dust, may consist of dust-tight, smooth material, with the result that it is externally not dusty or dust laden and internally as well above the filling level practically no dust adheres. Such a container may essentially be completely filled so that it accordingly has to be less frequently replaced or emptied.

These known devices are however, like other known equipment, disadvantageous to the extent that during the course of time filtered off residual dust collects in the filter chamber and reduces the filtering area available. Therefore it is necessary for the filter device to be taken to pieces from time to time for removal of the accumulated residual dust. This is an inconvenience and leads to the escape of dust into the environment.

SHORT SUMMARY OF THE INVENTION

Accordingly one object of the present invention is to provide a device of the type initially mentioned with which there is less contamination.

In order to achieve these and/or other objects appearing from the present specification, claims and drawings, in the present invention, on the lower side of the filter chamber a dust outlet opening is provided for the removal of the filtered off dust and a connection opening for the dust collecting container is jointly associated with both with the dust outlet opening of the dust separator and the dust outlet opening of the filter chamber, the transition from the dust outlet opening of the filter chamber to the connection opening is provided with a valve device, which by means of an externally operated actuating device is able to be moved between an operating position shutting the transition and a cleaning position making passage through the transition possible.

It is in this manner that the dust retained by the filter device and deposited in the filter chamber may be removed when the dust aspirating means is switched off, if the valve device is moved into its cleaning position so that the dust drops into the dust container. If this is done from time to time as necessary, it is quite impossible for any substantial quantity of dust to collect in the filter chamber. Therefore it is unnecessary for the filter device to be taken off from time to time.

Because the dust dropping out of the filter chamber, like the dust separated by the dust separator, also passes to the common connection opening, both the amounts of dust are collected in the same dust collecting container, which is connected with the connection opening, something which simplifies the design of the filter. In connection with this the there is the fact that the filter chamber may be separated from the common connection opening during operation by means of the valve device. Otherwise during operation the dust output opening of the dust separator and the dust outlet opening of the filter chamber would be directly connected with each other.

Further advantageous developments and convenient forms of the invention will be understood from the following detailed descriptive disclosure of one embodiment thereof and of various possible modifications in conjunction with the accompanying drawings.

Figure 3:
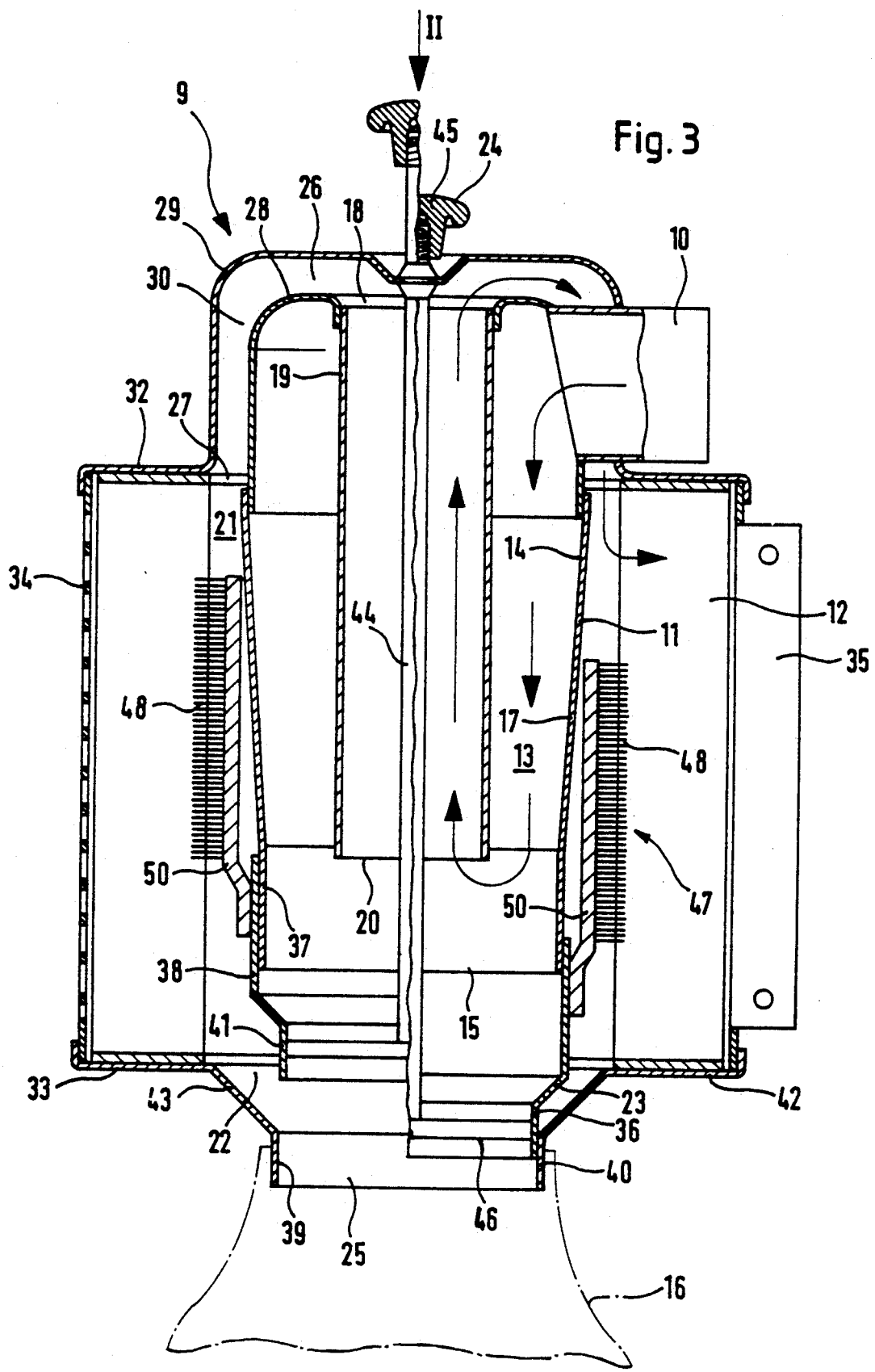

FIG. 3 shows the same design of the device in accordance with the invention in a longitudinal section as taken on the line of section III—III, the plan of section being somewhat offset adjacent to the inner end of the suction port and being taken through the end of the port (in the half of FIG. 3 shown on the right the valve device is arranged in its operational position and in the left half in the cleaning position).

DETAILED ACCOUNT OF WORKING EMBODIMENTS OF THE INVENTION.

Figure 1:
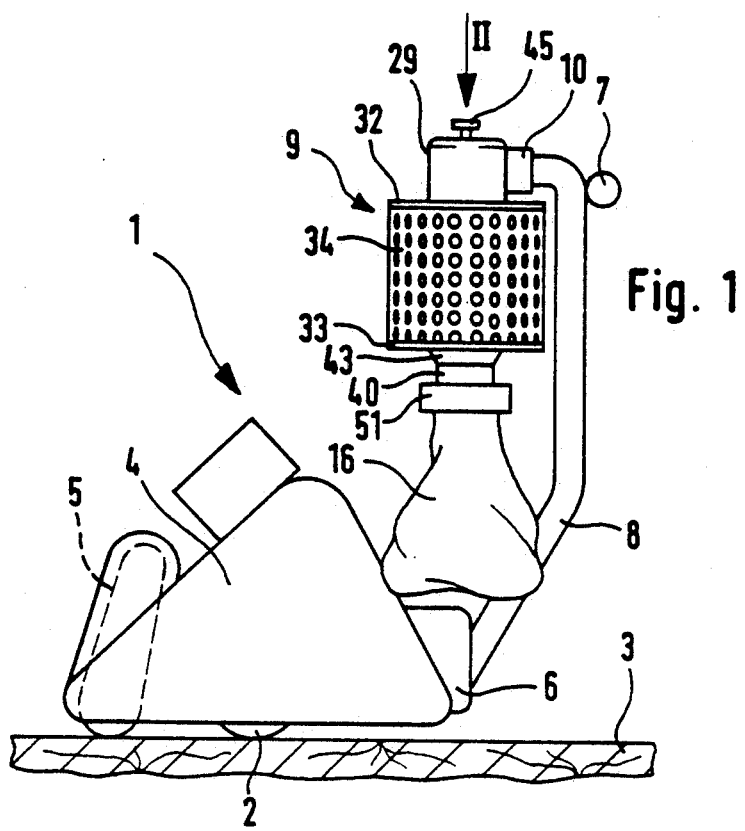
FIG. 1 is a diagrammatic lateral elevation of sanding machine for wooden floors fitted with a device in accordance with the invention.

The floor sanding machine illustrated in FIG. 1 in a diagrammatic manner is pushed or drawn along the wood floor 3 and runs on castors and/or wheels 2 on its base. In the machine housing 4 a sand paper belt 5 is driven by a motor and projects somewhat from the lower side of the motor and is in engagement with the wood floor 3. The dust produced during sanding the floor 3 is drawn off by means of a blower 6 from the point at which it is produced adjacent to the sand paper belt 5. Such dust laden air then passes into the suction side of the blower 6 through a tube 8 which extends upwards and bears a handle 7 for pulling and pushing the machine. At the end of the tube a device 9 is connected which serves to remove the dust from the aspirated, dust laden air and for collecting the dust.

The floor sanding machine 1 might be designed in a manner different to that illustrated. Furthermore the device 9, which is described in following in detail could in principle be utilized with other work processing machines whose operation involves the aspiration of dust laden air.

The device 9 has on the outlet side a suction port 10, which is adapted to be connected the part supplying the dust laden air, that is to say in the working embodiment, the tube 8. The dust laden air entering through the suction port 10 passes to a dust separator 11, which is followed by a filter device 12 further downstream in the air path and which consists of air permeable material retaining the dust with the result that the air freed of dust emerges through the filter device 12 back into the surroundings. The flow path is indicated by arrows drawn in the right part of FIG. 3. In the cleaning setting depicted on the left of the valve device, which is still to be described, the aspiration of dust is halted so that in this position there is no air flow.

It will be clear that in the operating setting of the valve device it is naturally the case that the air flows through the entire device.

The illustrated dust separator 11 has a substantially radially symmetrical configuration and is preferably in the form of a centrifugal or cyclone separator. In this respect it is a question the separator 11 having a tubular housing which in the operating setting is substantially vertical and into whose upper part the suction port 10 opens tangentially. In the interior space 13 of the dust separator 11 a downwardly directed, helical rotating flow will be produced (in FIG. 3 the arrows indicating the flow are for the sake of simplicity shown as being axially directed, that is to say they only indicate the axial component of the helical rotating flow), the dust particles being forced by the centrifugal force acting on them to move towards the inner surface 14 of the dust separator's housing wall and as a consequence of the effect of gravity and the axial component of the air flow being caused to move downwards to a dust outlet opening 15 arranged at the lower side of the dust separator 11. Underneath the dust outlet opening 15 it is possible for a dust container 16, which in FIG. 3 is shown in broken lines to be connected so that the dust deposited in dust separator 11 will drop under the effect of gravity through the dust outlet opening 15 into the dust container 16. In the working embodiment the dust outlet opening 15 extends over the entire cross section of the dust separator 11, that is to say the tubular housing constituting separator is generally open downwards.

A substantial part of the dust separator housing is in the form of a downwardly narrowing portion 17 with a small taper angle, something that causes a centrally directed flow in the downward direction. In the lower part of the dust separator the direction of flow of the air reverses to move in the central part upwards to the air outlet opening 18, arranged at the top, of the dust separator. In this case the dust separator 11 has over its dust outlet opening 15 a central descending tube 19, whose lower end 20 adjacent to the dust outlet opening 15 is open and whose opposite end constitutes the air outlet opening 18 and is connected with the filter device 12. In this descending tube 19 there is the already mentioned upward motion of the air.

By far the larger quantity of the dust contained in the incoming air is separated in the dust separator 11 and drops from it into the container 16. In the air leaving the air outlet opening 18 there is consequently only a small residual fraction of the original quantity of dust. It has been shown by tests that the configuration of the separator may be so optimized that approximately 98% of the dust can be precipitated.

The filter device 12 following the air outlet opening 18 opening along the flow path shuts off a filter chamber 21, which is connected with the air outlet opening 18, from the surroundings. At the lower side of this filter chamber 21 a dust outlet opening 22 is arranged, the already mentioned dust collecting container 16 being arranged underneath the dust outlet opening 22 and a valve device 23 being provided for the transition from the dust outlet opening 22 to the dust collecting container 16, such valve device 23 being able to be moved between an operating position (to the right in FIG. 3) and a cleaning position (on the left in FIG. 3) permitting flow through the transition by means of an external actuating device 24.

In principle it would be possible to provide a separate dust collecting container for the filter chamber 21, but however it is readily apparent that the coming dust collecting container 16, which is provided both for the dust outlet opening 15 of the dust separator 11 and also for the dust outlet opening 22 of the filter chamber 21, has advantages. The dust collecting container 16 may be connected with a connection opening 25 in a manner which is not illustrated in detail, the connection opening 25 being arranged underneath the dust outlet opening 15 of the dust separator 11 and the dust outlet opening 22 of the filter chamber 21. In this respect the dust separator outlet opening 15 is always connected with the connection opening 15, whereas the filter chamber outlet opening 22 is only connected with the connection opening 25 when the valve device 23 is in the cleaning setting thereof.

During operation, that is to say when dust aspiration is in progress, the valve device 23 will be in its operating position separating the filter chamber 21. Otherwise the inner space 13 of the dust separator 11 and the filter chamber 21 would be connected together at the bottom. The residual quantity of dust passing during operation from the separator to the filter device 12 is filtered off by the filter device from the air then emerging and drops, if the dust does not remain clinging to the filter device, downwards to the lower side of the filter chamber 21, where the dust escape opening 22 is provided. If the dust collecting here during the course of time is to be removed, it is only necessary, with the aspiration of dust halted, to set the valve device 23 in its cleaning position so that the passage downwards to the container 16 is freed and the dust will slip or drop into the container owing to the effect of gravity.

The filter device 12 is in the form of a sheet or flat structure, the filter material assuming a vertical position. In this respect it is a question of an inherently conventional filter material such as paper or non-woven material. A particularly large filter area and a device with a minimum overall size are possible if the filter device 12 has the configuration of a ring surrounding the dust separator 11 with the result that the filter chamber 21 located between them also extends in the form of a tube. The dust separator 11, the filter chamber 21 and the filter device 21 are also coaxially arranged, the dust separator constituting the inner limit of the filter chamber 21. The dust outlet opening 2 of the filter chamber is also annular, that is to say, the filter chamber 21 is open right the way round in a downward direction.

The air outlet opening 18 of the dust separator 11 is arranged centrally in the top of the dust separator and is connected via an annular connection plenum 26 with the top 27 of the filter chamber 21. In this respect the arrangement is best so designed that the connection plenum 26 is delimited on the one hand, inwards, by an annular wall 28 projecting from the edge of the air outlet opening 18 and on the other hand, that is to say outwards, by an outer wall 29 extending at a distance from the annular wall 28 and spanning the air outlet opening 18. The annular wall 28 and the outer wall 29 extend like a mushroom from the air outlet opening. In this respect the connection plenum 26 is composed of a radial portion 30 turned towards the air outlet opening 18 and of an axial portion adjacent to it, which axial portion extends at an axial distance from the air outlet opening 18, of the filter chamber.

The outer wall 29 constitutes the top side of the device, the end, nearest to the filter device 12, having a radially outwardly directed annular holding flange 32 mounted on it between which and a lower holding flange 33, which is also annular, the filter device 12 is held. The upper holding flange 32 is arranged adjacent to the annularly open top 27 and the lower holding flange 33 is adjacent to the annularly open dust outlet opening 22 of the filter chamber 21.

Figure 2:
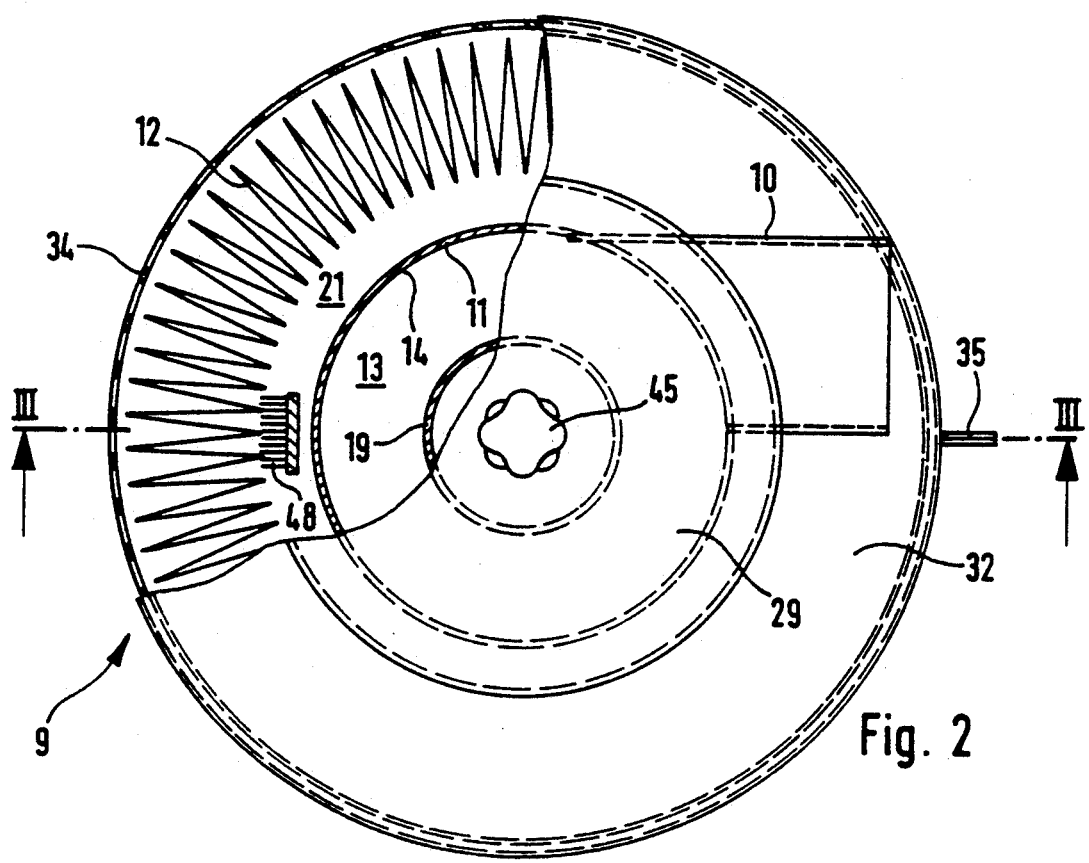
FIG. 2 shows the device as employed in the system of FIG. 1 in a plan view on a larger scale looking in the direction of the arrow II in FIGS. 1 and 3, partly in a cross section generally halfway up, the parts underneath the plan of section and also lines being omitted in order to make the drawing more straightforward.

As is more particularly illustrated in FIG. 2, the filter device 12 or, respectively, the filter material constituting it, is folded within the annular structure in a zigzag manner. This leads to a larger filter area. This filter device 12 is separated from the surroundings by a perforated sheet 34 of metal which serves for protection of the filter device against mechanical damage from the outside and through its holes the air passes after being freed of dust, into the environment. The perforated sheet metal structure 34, arranged in an encircling array corresponding to the annular structure of the filter device and therefore in the working embodiment is cylindrical, is also held between the two holding flanges 32 and 33, which for this purpose have an edge overlapping the end of the perforated sheet metal structure and flanged somewhat. It is possible for a holding device, for instance in the form of a sheet metal strips 35, to extend outwards from the outer side of the perforated sheet metal, by means of which the device can be secured to the respective machine, that is to say in the case of the machine illustrated in FIG. 1, on the tube 8. It will be clear that the type of attachment of the device of the respective machine may be different to the one illustrated.

The suction port 10 is arranged over the filter device 12, extends through the connection plenum 30 and opens into the part with the annular wall 28 tangentially from the side into the inner plenum 13 of the separator 11. In principle it would be possible for the suction port to be arranged to extend through the filter device as well.

As already mentioned the dust outlet opening 22 of the filter chamber 21 is able to be connected by means of the valve device 23 with the intermediate space between the dust separator 11 and the connection opening 25, which more or less constitutes the descending path for the dust coming from the separator. This valve device 23 is conveniently constituted by a valve slide 36 able to be operated from the outside. In this respect it is advantageous from the point of view of the radially symmetrical arrangement of the working embodiment that a sliding sleeve which is able to be moved in the axial direction along the descending path and is surrounded by the outlet opening 22 of the filter chamber 21, as valve slide 36 is arranged at the lower side, that is to say the part adjacent to the dust outlet opening of the dust separator 11. In this respect it is therefore a question of a tubular valve slide 36, which is arranged coaxially in relation to the separator 11. In this case it is best arranged so that it may be slid directly on the separator 11 because the dust separator 11 has a cylindrical housing part 37 on its lower side, with which part 37 a cylindrical guide part 38 of the sliding sleeve 36 is in telescoping relationship. The sliding sleeve 36 consequently constitutes a sort of extension of the dust separator 11. It has turned out to be an advantage that the sliding sleeve 36 is telescoped or slipped onto the dust separator 11 so that the conditions of flow in the dust separator are not impaired.

For the end, opposite to the dust separator 11, of the sliding sleeve 36, there is an stationary annular seat 39 so that the sliding sleeve 36 rests against the sliding sleeve 36 in its operating position and in its cleaning position is lifted clear thereof so that in the cleaning position there is an annular passage from the dust outlet opening 22 to the connection opening 25.

The annular seat 39 is constituted by a cylindrical portion 40 of the housing. The associated lower end part 41 of the of the sliding sleeve 36 is also cylindrical and has an external diameter corresponding to the inner diameter of the cylindrical housing portion 40 so that it may slidingly fit into the cylindrical housing portion 40. The cylindrical housing portion 40 and the lower holding flange 33 are constituted by a bottom part 42 of the device consisting of sheet metal and are connected together by means of a conical wall portion 43, which delimits the dust outlet opening 22 and, respectively, the transition from the filter chamber 21 to the connection opening 25.

As already mentioned the sliding sleeve 36 may be operated from the outside. For this purpose in the working embodiment the design is best such that the actuating device 24 has an actuating rod 44 or the like which extends through the dust separator 11 and is able to be moved in an axial direction and which is fixedly connected with the sliding sleeve 36 and extends towards the opposite top of the dust separator 11. In this respect the actuating rod 44 is arranged coaxially in relation to the dust separator 11 and is guide to run through the descending tube 19. It comes out of the top of the dust separator where it is provided with a handle 45. The lower end of the actuating rod 44 is for instance fixedly connected for instance via a T-like transverse rod 46 thereon with the inner side of the sliding sleeve 36. In order to transfer the sliding sleeve from its operating position into its cleaning position or back again it is merely necessary to pull or push the handle 45. By rapid reciprocating movement of the handle 45 there is a sort of shaking effect, something which promotes descent of the dust downwards out of the filter chamber.

In accordance with a further convenient feature an externally operated cleaning device 47 is provided for acting on the filter device 12 for stripping and/or shaking off dust. In the illustrated working embodiment of the invention it is in this respect a question of at least one brush 48, two such brushes being illustrated. If the cleaning device 47 or, respectively, the brushes 48 are moved using the filter device 12, the dust clinging to the latter will drop downwards.

The actuation of the cleaning device 47 may be performed very simply if the cleaning device is fixedly connected with the valve device 23, that is to say in the working embodiment with the sliding sleeve 36. On moving the sliding sleeve 36 the cleaning device will consequently be moved as well. The lower end of the brush carrier 50, which bears at least one brush 48, is attached to the outer side of the sliding sleeve 36 with the result that the brush carrier 50 and hence the brush 48 extends along the outer side of the dust separator 11 upwards.

In order to ensure that the cleaning device 47 may be moved not only coaxially but furthermore in the peripheral direction it is an advantage that the sliding sleeve 36 may be not only moved from the outside in the axial direction but furthermore is able to be turned.

Because the dust container 16 serves only to receive the dust and does not serve to filter the dust laden air, it consists of completely dust-proof material. In this respect the dust collecting container 16 preferably consists of transparent material so that the degree of filling may be see at any time and it is therefore possible to recognize when the container is to be replaced. Such containers are best employed which are available in the form of transparent synthetic resin bags or sacks.

The connection device 51, via which the container 16 is connected with the connection opening 25, is not illustrated in detail. It renders possible a dust-tight connection of the container 16 and the removal thereof without releasing dust into the surroundings.

It is to be added that the actuating device 24 may be spring loaded towards the operating position of the sliding sleeve 36, for instance by having a suitable spring (not illustrated) acting on the actuating rod 44.

I claim:

1. A device for removing dust coming from air from a work processing machine and more particularly from a floor sanding machine, comprising a dust separator arranged in the flow path in the form of a centrifugal or cyclone separator, which has a lower dust outlet opening from which the separated dust drops along a descent path to a connection port for connection with a dust collecting container, and an upper air outlet opening for the outlet of the air freed of dust, and with a filter device arranged in the flow path downstream from the dust separator for filtering out the remaining dust, which has an annular configuration and surrounds the dust separator with the formation of filter chamber, which is connected with the air outlet opening of the dust separator, wherein on the lower side of the filter chamber a dust outlet opening is provided for the removal of the filtered off dust and a connection opening for the dust collecting container is jointly associated with both with the dust outlet opening of the dust separator and the dust outlet opening of the filter chamber, the transition from the dust outlet opening of the filter chamber to the connection opening is provided with a valve device, which by means of an externally operated actuating device is able to be moved between an operating position shutting the transition and a cleaning position making passage through the transition possible.

2. The device as claimed in claim 1, wherein the dust outlet opening of the filter chamber is able to be connected by means of a valve slide, acting as a valve device, with the descent path of the dust between the dust separator and the common connection opening.

3. The device as claimed in claim 2, comprising on the lower side of the dust separator a sliding sleeve as a valve slide, which is surrounded annularly by the outlet opening of the filter chamber and is able to be slid axially along the dust descent path, the end of such sleeve remote from the dust separator and adjacent to the connection opening being provided with a stationary annular seat so that the sliding sleeve in the operating position thereof is engagement with the annular seat and in its cleaning position is lifted clear of the annular seat.

4. The device as claimed in claim 3, wherein on its lower side the dust separator has a cylindrical housing portion, with which a cylindrical guide portion of the sliding sleeve is moving telescoped.

5. The device as claimed in claim 4, wherein the sliding sleeve is slipped onto the dust separator.

6. The device as claimed in claim 2, wherein the actuating device for setting the valve slide has an actuating rod which extends through the dust separator and may be moved in an axial direction, which rod is fixedly connected with the valve slide and extends towards the opposite top side of the dust separator.

7. The device as claimed in claim 6, wherein the actuating rod or the like extends through a descending tube arranged centrally in the dust separator and having a lower end constituting the air outlet opening connected with the filter chamber.

8. The device as claimed in claim 1, wherein the filter device is designed in a zigzag manner.

9. The device as claimed in claim 1, wherein a cleaning device which acts on the filter device for stripping off and/or shaking off dust and is able to be operated from the outside, is arranged in the filter chamber.

10. The device as claimed in claim 9, wherein the cleaning device is constituted by at least one brush.

11. The device as claimed in claim 9, wherein the cleaning device is fixedly connected with the valve device.

12. The device as claimed in claim 11, wherein the sliding sleeve is arranged so that it may be moved from the outside not only in the axial direction but also in rotation.

13. The device as claimed in claim 1, wherein a dust collecting container of transparent material is associated with the device.

* * * * *